United States Patent [19]

Mendes et al.

[11] Patent Number: 5,657,621
[45] Date of Patent: Aug. 19, 1997

[54] VEHICLE FOR TRANSFORMING CUT FIELD HERBAGE SUCH AS ALFALFA INTO FEED CUBES FOR LIVESTOCK

[75] Inventors: Joseph L. Mendes; Edward J. Mendes; Michael A. Mendes, all of Hilmar, Calif.

[73] Assignee: Triple "M" Ranch, Hilmar, Calif.

[21] Appl. No.: 510,478

[22] Filed: Aug. 2, 1995

[51] Int. Cl.[6] .............. A01D 61/00; B30B 11/22
[52] U.S. Cl. .............. 56/16.4 D; 56/16.4 D; 56/16.6; 56/228; 100/907; 100/41
[58] Field of Search .............. 56/11.1, 16.4 D, 56/16.4 A, 16.4 R, 16.6, 449, 472, 474, 228, 14.3; 460/119; 100/905, 907, 903, 157, 39, 41

[56] References Cited

U.S. PATENT DOCUMENTS

| | | | |
|---|---|---|---|
| 193,693 | 7/1877 | Davis | 100/233 |
| 704,698 | 7/1902 | Edison | 44/589 |
| 2,683,378 | 7/1954 | Amal | 52/474 |
| 3,017,845 | 1/1962 | Bonnafoux | 100/907 X |
| 3,385,235 | 5/1968 | Rickerd et al. | 56/16.4 D |
| 3,430,583 | 3/1969 | Pool et al. | 56/16.4 D X |
| 3,613,335 | 10/1971 | Forth | 56/16.4 D |
| 3,673,951 | 7/1972 | Romer | 56/16.4 D X |
| 3,946,660 | 3/1976 | Kuhtreiber | 100/39 |
| 4,918,910 | 4/1990 | Sheehan et al. | 56/341 |
| 5,009,062 | 4/1991 | Urich et al. | 56/341 |
| 5,092,114 | 3/1992 | Eggenmeuller | 56/341 |
| 5,167,581 | 12/1992 | Haag | 56/16.6 X |
| 5,303,533 | 4/1994 | Caillouet | 56/14.3 |
| 5,352,252 | 10/1994 | Tolmie | 44/580 |

*Primary Examiner*—Terry Lee Melius
*Assistant Examiner*—Thomas A. Beach
*Attorney, Agent, or Firm*—Bernhard Kreten

[57] ABSTRACT

A device which takes cut alfalfa laying in a field and turns it into a plurality of pressed cubes. A water spray conditions the cut alfalfa to have the right moisture content for subsequent processing. A pick up station delivers the alfalfa off of the ground and feeds it to an auger and paddle area for subsequent conveyance to a chopping station where the alfalfa is comminuted to the appropriate length. Thereafter, the chopped alfalfa is conveyed into a press where the cubes of alfalfa are formed by extrusion. Conveyors allow the formed cubes to be placed in a trailer hitched to the vehicle. By providing a vehicle which processes the alfalfa in the field, enhanced quality of the alfalfa cubes and efficiency results.

25 Claims, 14 Drawing Sheets

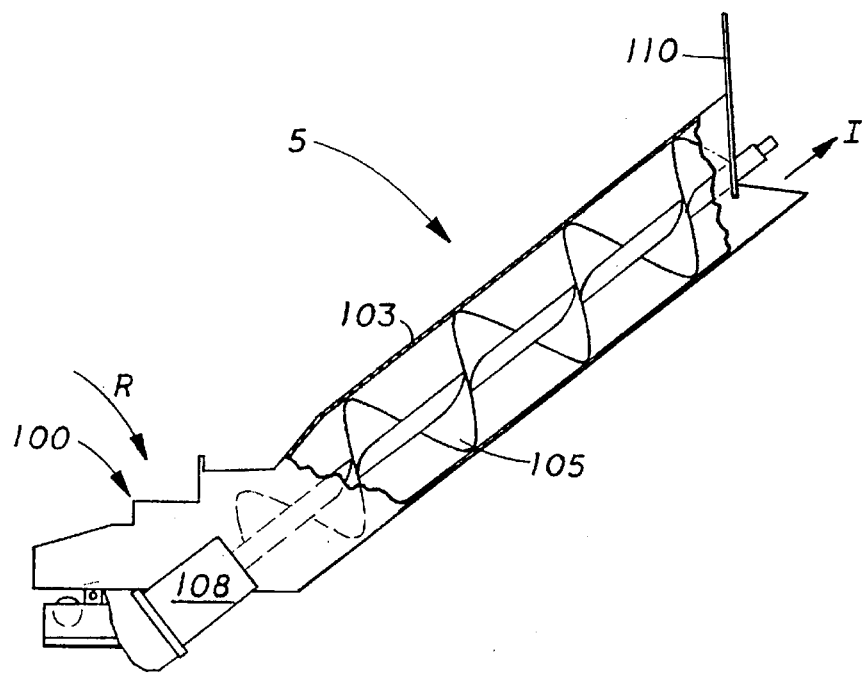
FIG. 4
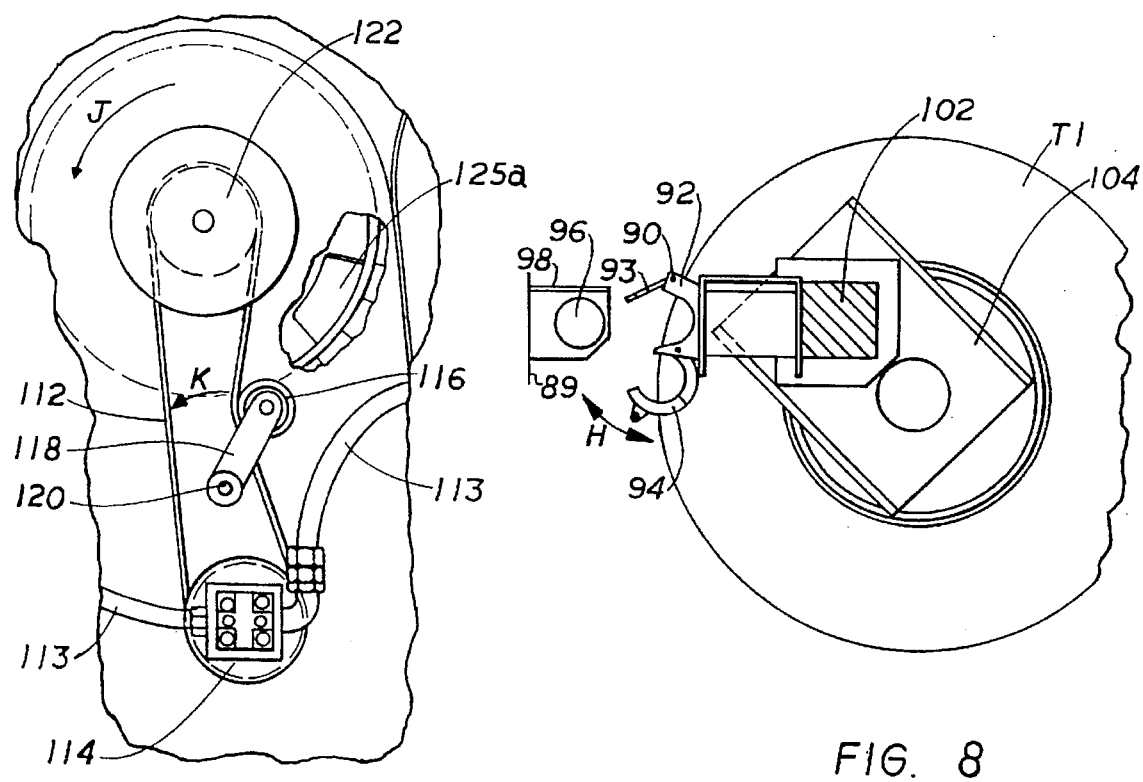
FIG. 7
FIG. 8

VEHICLE FOR TRANSFORMING CUT FIELD HERBAGE SUCH AS ALFALFA INTO FEED CUBES FOR LIVESTOCK

FIELD OF THE INVENTION

This invention relates generally to a vehicle which gathers cut grasses commonly used as food for livestock and presses the cut grasses into cubes for efficient storage and convenient deployment to livestock, such as dairy herds, cattle and horses. More specifically, the instant invention is directed to a wheeled agricultural vehicle which: adjusts the moisture content for cut alfalfa lying in a field, a pick up apparatus which gathers the cut alfalfa from the field, an auger and paddle collection area which moves the alfalfa to a chopper section which further cuts alfalfa into smaller pieces which is thereafter conveyed to a press carried on the vehicle so that the alfalfa is formed into cubes while the vehicle harvests the alfalfa. Thereafter the cubes are discharged from the press and conveyed onto a trailer for subsequent utilization.

BACKGROUND OF THE INVENTION

Cubing machines for field grasses such as alfalfa are known to exist. However, these cubing machines typically are stationary and require that the cut grass be transported to the cubing station for processing of the cut grass into cubes.

Cubes for use as forage for livestock are extremely desirable because they occupy substantially less space than uncompressed forage. If properly pressed, a well-formed cube encourages the animal to eat not only the upper portion of the plant which typically comprises the leafy portion of a field grass, but also the less tasty stalk which has beneficial properties as a component of fiber required for the livestock's well being.

One problem that had afflicted the stationary processing of cut grass into cubes included the fact that the cut grass which was transported to the cubing station did not have uniform characteristics from one batch to the next. In order to properly control the density of the cube, the moisture content of the field grass must be carefully controlled. If there is some delay in processing field grass into cubes and if the field grass has a relatively high degree of moisture, the quality of the cubes can deteriorate because of unwanted degradation, such as the formation of mold on the grass. On the other hand, should the field grass be delivered in an excessively dry condition, excessive pressure may be required to form the grass into a brick-like cube. In an attempt to compensate for variations in grass characteristics, many stationary cubers will use a binding agent other than water in order to assure proper cube formation. For example, bentonite is a known binding agent used in the formation of cubes. Unfortunately, bentonite can be viewed as an adulterant which does not enhance the nutritional value of the cube being fed cattle and more seriously, can result in a cube which is too dense for livestock to directly chew. When an overly solid cube exists, it is then required that the cube be manually broken down. Other problems that can afflict a stationary cube forming machine includes the potential for bringing field grass to the cubing station of a lesser quality.

The following prior art reflects the state of the art of which applicant is aware and is included herewith to discharge applicants' acknowledged duty to disclose known prior art. However, it is respectfully stipulated that none of these citations teach singly nor render obvious when considered in any conceivable combination the nexus of the instant invention as set forth hereinafter and as particularly claimed.

| PATENT NO. | ISSUE DATE | INVENTOR |
|---|---|---|
| 193,693 | July 31, 1877 | Davis |
| 704,698 | July 15, 1902 | Edison |
| 3,946,660 | March 30, 1976 | Kuhtreiber |
| 4,918,910 | April 24, 1990 | Sheehan, et al. |
| 5,009,062 | April 23, 1991 | Urich, et al. |
| 5,092,114 | March 3, 1992 | Eggenmueller |
| 5,352,252 | October 4, 1994 | Tolmie |

For example, the patent to Urich, et al. teaches the use of a baling apparatus for forming fibrous bulk material or the like into a baled unit and binding it. The apparatus includes a wheeled frame and is provided with a rotatable auger means, a tubular housing surrounding said auger means and a feed means adjacent said housing for feeding the material to be baled to said auger means. The material to be baled is fed from the auger means through a die into a packing chamber and further into a binding means.

The patent to Eggenmueller teaches the use of an apparatus for harvesting field fodder. The device is a pick up baler for forming rectangular bales of harvested agricultural material or field fodder. The material to be baled is loaded onto a compressing device which shreds and crushes the fodder into a highly densified layer which is then introduced into the baling chamber via a press channel. The layer is then additionally densified and compacted by a pressing plate. The rectangular bale is then extruded through a rear discharge opening of said baling chamber.

The remaining citations show the state of the art further and diverge even further from the focal point of patentable novelties set forth hereinafter.

SUMMARY OF THE INVENTION

The instant invention is distinguished over the known prior art in a multiplicity of ways. One salient difference involves the provision of a cube forming machine integrally with an agricultural vehicle so that the cubes can be contemporaneously formed while the cut field grass is being harvested from the field.

A prime mover, such as a tractor, has a collection station configured as a pick up apparatus which gathers the cut field grass at a leading portion thereof. Slightly ahead of the pick up area, a spray station is strategically positioned to alter the moisture content of the cut grass as is necessary for effective brick or cube forming. By brick or cube, it is meant a solid of somewhat rectangular configuration having four substantially planar sides and oppositely facing ends. After the cut grass has been sprayed with water and then gathered, it is fed into the machine via a series of augers and paddles which centrally locate the cut grasses into a front portion of the machine.

Processing of the cut grass includes a chopping station configured a reel type chopper which comminutes the grass into shortened yet elongate strands so that the size of the strands compliment the dimensional requirements of the press used to form the cubes. After chopping, a conveyor transfers the chopped grass from a central lowermost portion of the agricultural vehicle between a first pair of spaced parallel vehicle wheels and the conveyor elevates the cut grass and discharges the cut grass into a press. The press includes a rotary wheel constrained to orbit about an axis like a cam and force the cut grass through an extruder. The extruder includes a series of bores through which the cut grass is forced to mold the grass into cubes. The extruder mold coacts with a deflector formed on an interior of a housing which surrounds the press to break the extruded cubes into lengths. Under the application of pressure caused by the wheel and extruder, both heat and steam are generated, and the cubes are thus formed.

A discharge area is provided which receives the formed cubes and carries the cubes along a side of the vehicle rearwardly to a transverse auger that locates the cubes back towards a center rear of the vehicle. Thereafter, a trailer, hitched to follow behind the vehicle, receives the cubes into a hopper and conveys them via an elevator into a main body of a trailer for subsequent utilization. The trailer also supports a water tank thereon which communicates with a forwardmost portion of the agricultural vehicle for providing the needed water to the spray station located forward of the pick up area.

Each drive wheel of the agricultural vehicle has its own independent hydraulic motor so that adequate clearance is provided on the underside of the vehicle where the conveyor transfers cut grass under the tractor from the chopper to the press. A hydraulic system also powers several moving parts of the cuber processing system either directly or indirectly and includes appropriate heat exchange control to maintain proper operating temperature for the hydraulic fluid and maintain proper fluidic pressure in the hydraulic circuit. A control circuit is also provided to regulate dispensing the water to the cut grass.

In this manner, alfalfa or other field grass, after having been cut and having laid in the field, is formed into cubes having an optimal density and food value without the need for binders such as bentonite because the harvested grass is optimally processed.

OBJECTS OF THE INVENTION

Accordingly, it is a primary object of the present invention to provide a novel and useful agricultural vehicle for transforming cut grass into cubes.

Another object of the present invention is to provide a device as characterized above which takes cut field grass, such as alfalfa directly from its resting place after having been mowed and appropriately cured in the field and forms the cubes in the field when the quality of the forage grass and therefore the cubed food product is at its highest.

A further object of the present invention is to provide a device as characterized above which does not require the use of adulterants in order to form an effective cube.

A further object of the present invention is to provide a device as characterized above which is extremely safe to use, durable in construction and reliable in service.

A further object of the present invention is to provide a device as characterized above which includes some standard, pre-existing components which are commercially available but have been modified.

Viewed from a first vantage point, it is an object of the present invention to provide an apparatus for processing cut field grass such as alfalfa into cubes in which a wheeled prime mover is equipped with means for picking up the grass while in a field, conveyor means supported by the prime mover for transferring the cut grass, cube forming means fed by said conveyor means and linked to said prime mover so that the grass can be fed from said conveying means and compacted into cubes, and delivery means coupled to said cube forming means for delivering formed grass cubes from said cube forming means.

Viewed from a second vantage point, it is an object of the present invention to provide a method for forming field grass into cubed livestock forage the steps comprising: growing and then cutting the field grass, picking up the cut grass with a prime mover, chopping the grass and pressing the chopped grass into cubes concurrently with the prime mover picking up more grass, so that the cubes are formed while the prime mover is working in the field, and conveying the cubes away from a cube forming area of a prime mover.

Viewed from a third vantage point, it is an object of the present invention to provide a cube formed from field grass and transformed from field grass into a cube while in a field where the field grass grew, the cube formed by: picking up the grass from the field by a prime mover, adjusting the moisture content of the cut grass, chopping the cut grass, subjecting the cut grass to heat and pressure while pressing the grass into a cube, and discharging the thus formed cube from the prime mover.

These and other objects will be made manifest when considering the following detailed specification when taken in conjunction with the appended drawing figures.

BRIEF DESCRIPTION OF THE DRAWINGS

FIG. 4 is a sectional view taken along lines 4—4 of FIG. 3.

FIG. 7 is a detail of that which is shown in FIG. 6 with a portion of a shroud removed to expose certain details of a cubing drum drive system.

FIG. 8 is a sectional view taken along lines 8—8 of FIG. 3 showing a coupling mechanism for a forward portion of the device.

DESCRIPTION OF PREFERRED EMBODIMENTS

Figure 1:
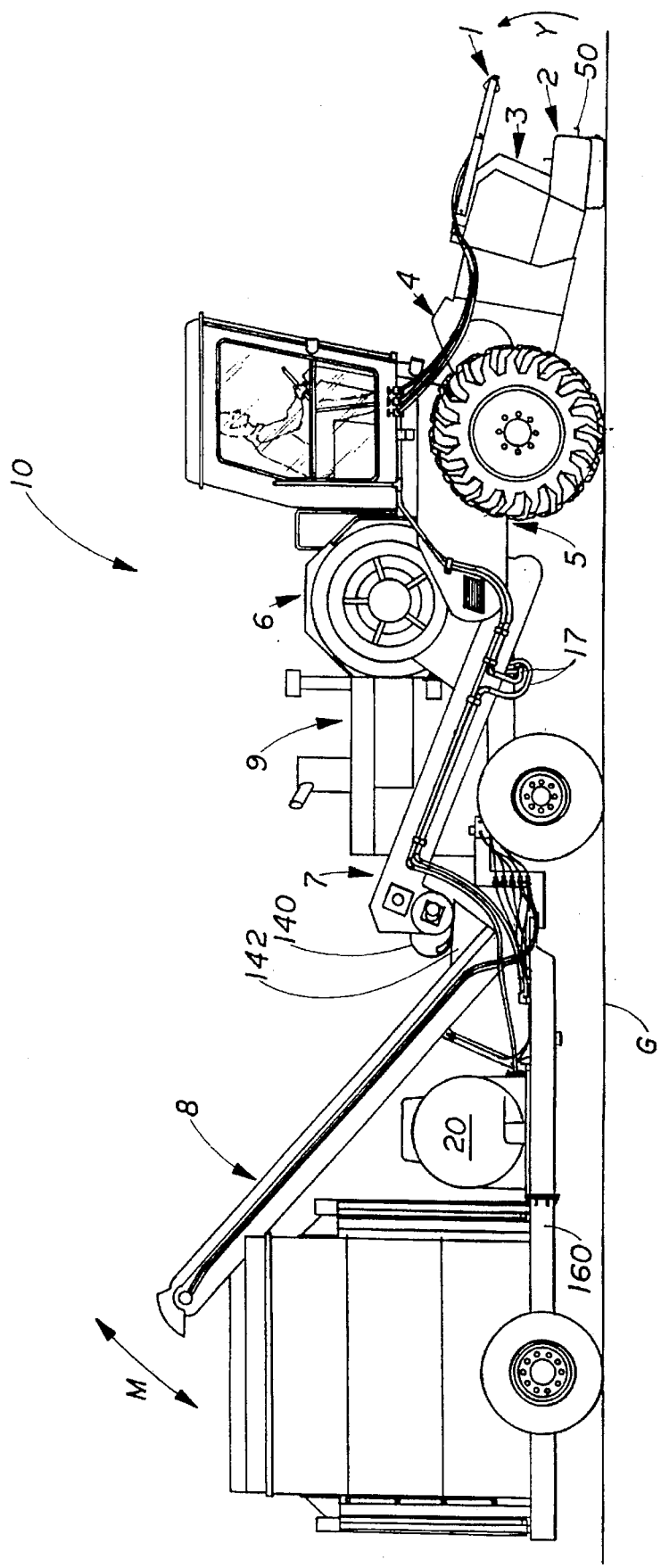
FIG. 1 is a side view of the apparatus according to the present invention.

Considering the drawings, wherein like reference numerals denote like parts throughout the various drawing figures, reference numeral 10 is directed to the cuber according to the present invention.

Figure 11:
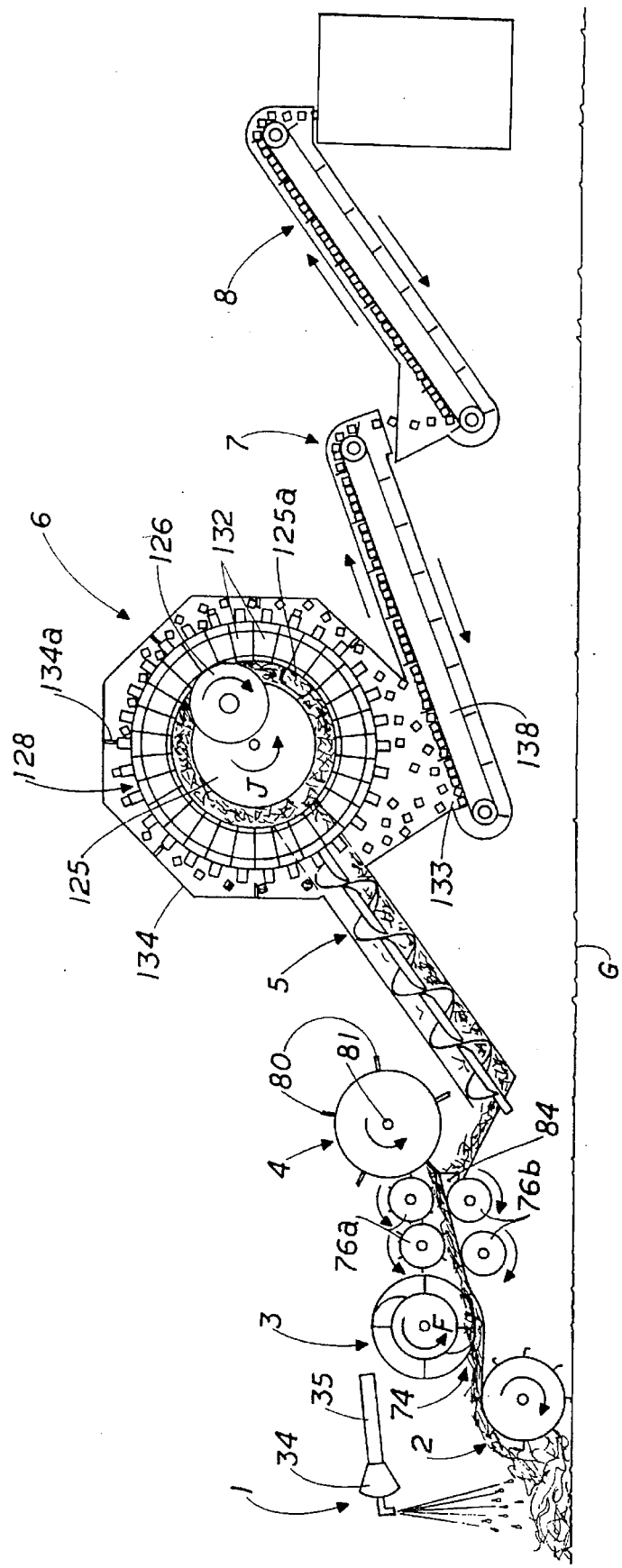
FIG. 11 is a process schematic that details the system as it converts field grass into cubes.

In its essence, the cuber 10, shown in its entirety in FIG. 1 and schematically in FIG. 11, includes a spray station 1 which adds moisture to the cut alfalfa, a pick up area 2 which gathers the cut and wet or moistened alfalfa from the ground G, and into an auger paddle system 3. This advances the alfalfa rearwardly to a cutting station 4 which shortens the length of the alfalfa. Upon advancement by an auger feed 5 that is formed on a bottom surface of the vehicle, the alfalfa can be advanced into a drum-type press 6 for extruding the cut, moistened alfalfa into cubes. A conveying system 7 transfers the thus formed cubes into an attending trailer 8 for subsequent deployment, for example via a satellite truck (not shown). The cuber 10 is powered by prime mover 9 which includes an engine which drives a hydrostatic pump that drives a hydraulic system to serve as a source of power for the drive wheels of the prime mover and all of the above enumerated subassemblies, either directly or indirectly.

Referring to FIGS. 1, 2, 5, 6, 9 and 11, details of the spray station can be explored. A water tank 20 is supported on the trailer 8 which travels behind the prime mover 9. The water tank has an inlet 36a (FIG. 9) on a top portion thereof or 36b, which is a side-mounted quick fill inlet, which replenishes water as is needed to the tank. The tank 20 also has an outlet 12 which communicates water to the spray head 1. The outlet 12 is in fluid communication with a filter 14 that protects a pump 16 disposed downstream of the tank 20. The pump 16 provides the motive force to cause the water to progress forwardly through a water conduit 22 downstream of the pump 16. The pump 16 is powered by a hydraulic motor 18. The conduit 22 passes from the trailer to the tractor via a quick connect coupling 23. The conduit 22 includes a gauge and bypass 24 (FIG. 5) which extends into the driver's cab D so that the driver can divert some or all of the water flow from the inlet back to the tank 20 via a return line 38 (FIG. 9) if so desired. The conduit 22 further communicates with a manifold having a series of pressure adjusting valves 26 that are solenoid activated in the driver's cab D which causes the fluid to branch into a plurality of ducts 28. Each of the valves 26 controls water from the manifold to the ducts 28 to allow the operator to control the degree of water to be sprayed via spray S (FIG. 5) on the alfalfa A. The ducts 28 lead to a spray bar 34 (FIG. 2) which supports the spray nozzles 30, a plurality of which are illustrated. The ducts 28 communicate with various of the nozzles 30 to control the amount of moisture that the alfalfa requires for effective subsequent processing. The nozzles 30, supported on the spray bar 34, are projected out forwardly from the cuber 10 by means of a forwardly extending spray bar support 32. The spray bar support 32 is allowed to cantilever to a forwardmost portion of the vehicle by means of its attachment to a housing within which the pick up apparatus 2, auger and paddle 3 and cutter 4 are located. Spray bar 34 may rotate via a pivot connection with support 32 about arrow X to direct the spray forwardly or rearwardly.

After correcting the alfalfa with an appropriate amount of moisture, the alfalfa can be gathered into the machine as shown in FIGS. 1, 2, 5 and 11. A forwardmost portion of the cuber 10 includes sled runners 40 at a lower extremity to allow the pick up apparatus to closely follow the ground G and accommodate surface irregularities of the ground. The sled runners 40 (FIG. 2) depend from feet 42 that are supported by side shrouds 44 that define a collection area on the forwardmost portion of the cuber 10. The shrouds 44 also support an axle 46 passing between the two spaced parallel shrouds 44. A chain driven sprocket 48 is supported at one end and provides the motive force to rotate the pick up apparatus 2 about the arrow B shown in FIG. 5. The pick up apparatus 2 is formed from a plurality of tines 50 each of which extend radially from the axle 46 and have free ends 52 which hook in the direction of rotation B so that as the pick up apparatus passes through the alfalfa, the tines pick up the alfalfa and lift the alfalfa A along the direction of the direction of the arrow B for subsequent processing in the auger and paddle area 3. The tines 50 are separated one from each other by a plurality of spacers 54 which sequester adjacent tines 50 and hold them in spaced relation. The tines' length varies as they rotate by retracting (or extending) between the spacers 54 as is known in the art. The sprocket 48 is connected to a drive gear 75 via chain 47 as shown in the diagram in FIG. 2A. Drive gear 75 is driven by drive shaft 77 (see FIG. 2A). A hydraulic motor could also drive the pick up apparatus 2.

Figure 2:
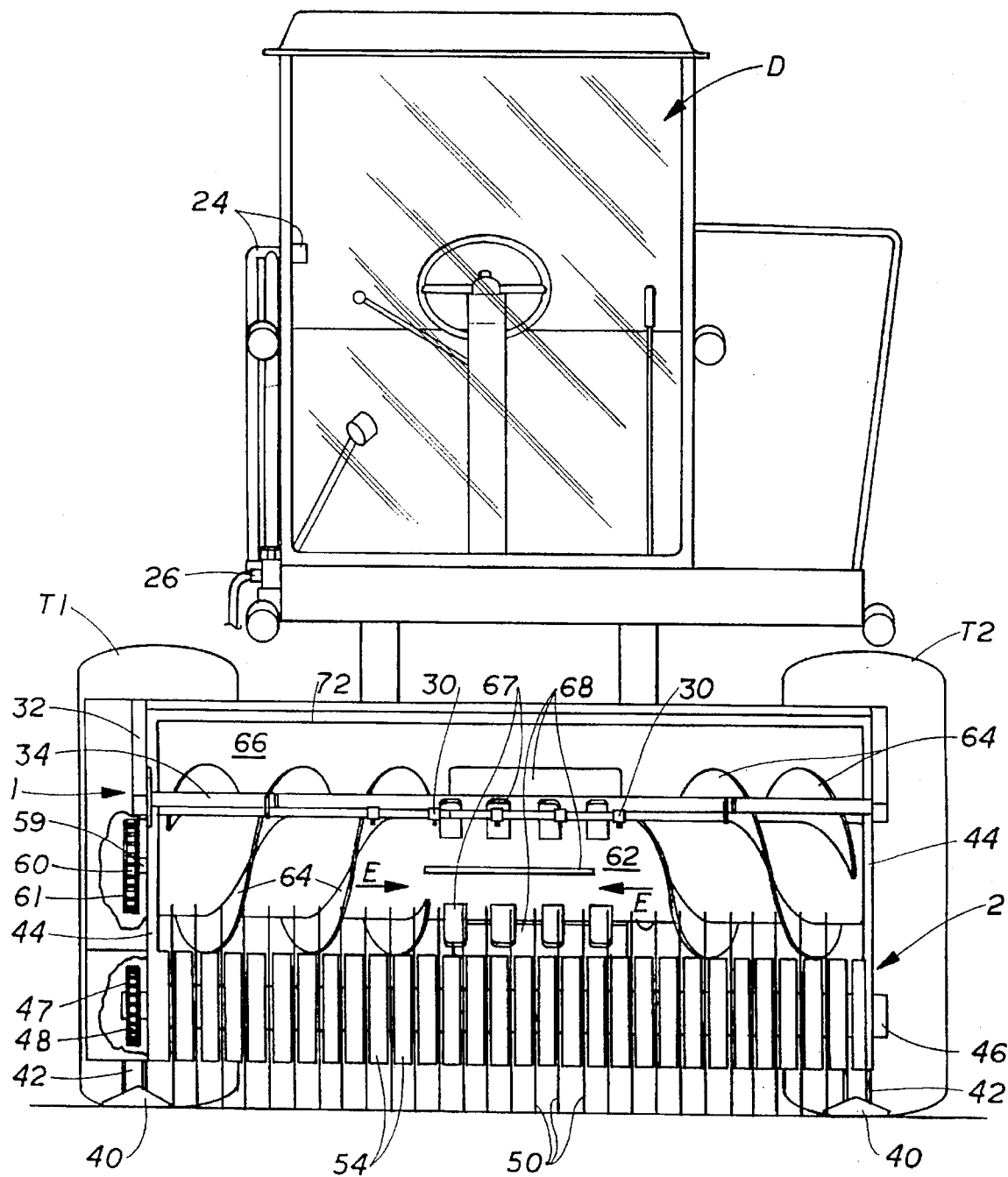
FIG. 2 is front view thereof.
Figure 2A:
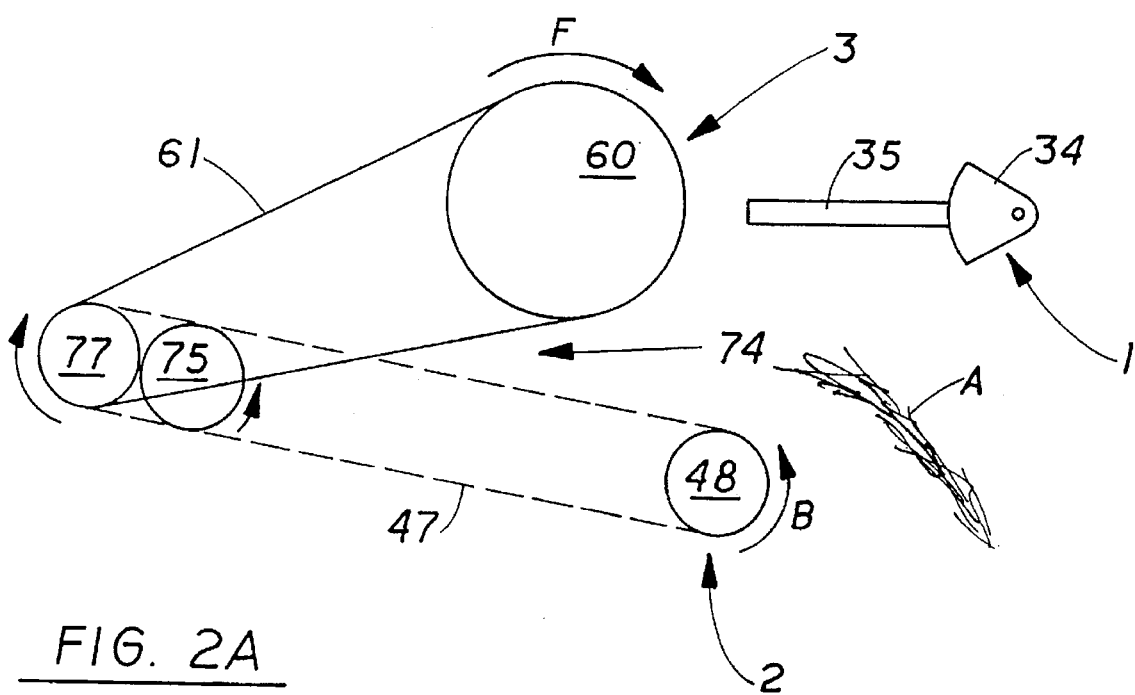
FIG. 2A is a drive diagram of the pick up apparatus and auger/paddle stations.

As shown, the pick up apparatus 2 delivers alfalfa A to the auger and paddle assembly 3. More specifically, in FIG. 2, the shroud 44 has a shaft opening for shaft 59 which is connected to a chain drive sprocket 60. In FIG. 2A, the driver sprocket 60 is driven along arrow F by a chain 61 connected to drive shaft 77. Sprocket 60 is operatively coupled to a shaft 62 (FIG. 2) which has two flights of augers 64 disposed thereon. The augers 64 each form a spiral of substantially helical configuration on outboard extremities of the shaft 62 and has a pitch which urges all of the alfalfa picked up by the pick up apparatus 2 to be advanced towards a centralmost area (along arrow E of FIG. 2) of the auger paddle assembly 3 by rotation about arrow F (FIG. 2A). A back-splash 66 is provided rearwardly of the auger to serve as a bearing surface helping the augers 64 to urge the alfalfa to the center of the device as indicated by the arrows E in FIG. 2. Also, plural rods 35 (FIG. 11), extending towards the auger along the length of bar 34 keep "light" alfalfa A from traveling over the auger paddle assembly. A plurality of paddles 68 radiate from the shaft 62 a central area between the laterally disposed augers 64. The paddies 68 are fixed on the auger shaft 62 and also move about the arrow F shown in FIG. 5. Fingers 67 may be located between the paddies 68. The back-splash 66 has a top wall portion 72 which helps force the alfalfa between the pick up 2 and auger paddle 3 within a passageway 74 shown in FIGS. 2A and 11. The passageway 74 feeds the alfalfa A to move along the direction of the arrow R (FIG. 5) in between two pairs of upper and lower pressure rollers 76. The upper rollers 76a are shown rotating counter-clockwise in FIG. 11, while the lower rollers 76b rotate clockwise. These pressure rollers define a "moving floor and ceiling" to assure that the alfalfa will move along the direction of the (FIG. 5) arrow R and into the chopper 4 shown in FIG. 11 and FIG. 5. It should be noted that the area below the chopper 4 (FIG. 6) and behind a beater bar 84 (FIG. 11) allows the cut alfalfa to be fed thereafter to an inclined auger 5 to be described.

In many respects, the chopper 4 evokes images of a reel-type mower (FIG. 12) in which a series of cutter blades 80 are supported on an exterior of a substantially cylindrical cutter base 82. Each of the blades 80 has a dimension such that it comes within dose contact with a beater bar area 84 (FIG. 11). Thus, the cutter blades' outer periphery comes close enough to the beater bar 84 to cut the alfalfa. Thus, alfalfa is chopped by passing between the beater bar 84 and the cutter blades 80 for subsequent processing. The cutter blades 80 and base 82 are driven by a belt mechanism 86 (FIG. 5) connected to a power pulley sheave 88 in which the sheave 88 is driven by a hydraulic motor. The belt mechanism 86 is actually a series of belts which drives the pulley sheave 83 of FIG. 12. This pulley mechanism 88, 86 and 83 also serve as the source of power to the pick up apparatus 2, auger and paddle assembly 3, and pressure rollers 76.

Figure 12:
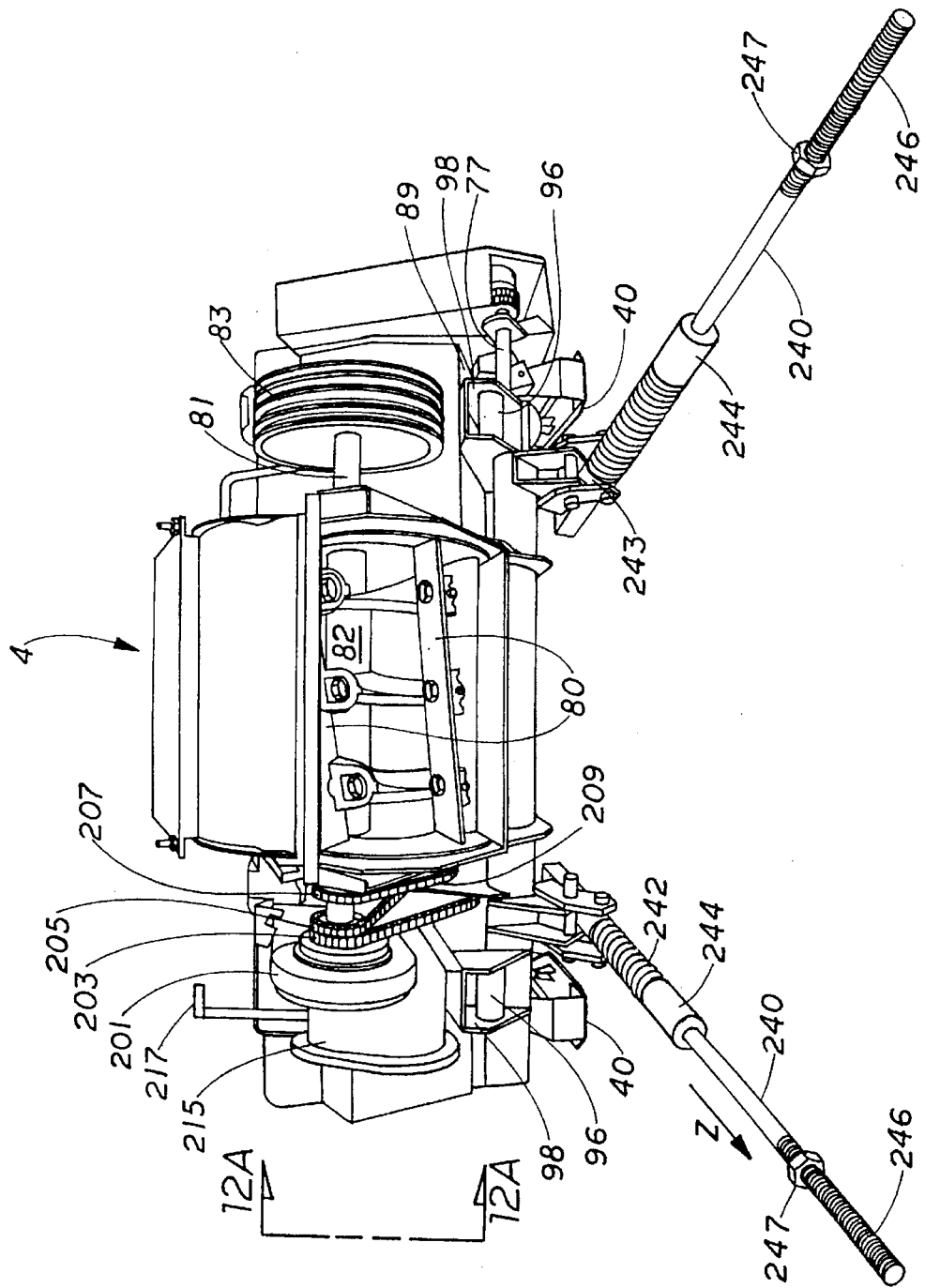
FIG. 12 shows details of the chopping station and drive train for chopping station, pick up apparatus, auger and paddle station and chopper conveyor.
Figure 12A:
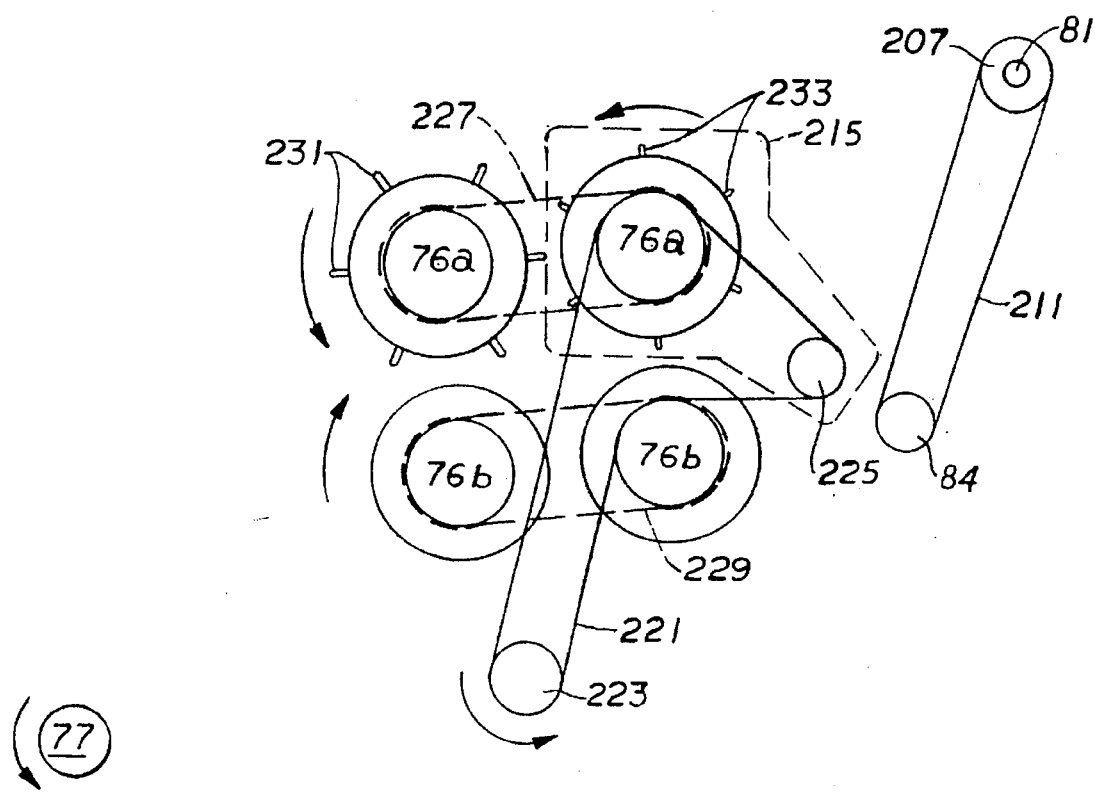
FIG. 12A shows a drive diagram for the pressure rollers.
Figure 12B:
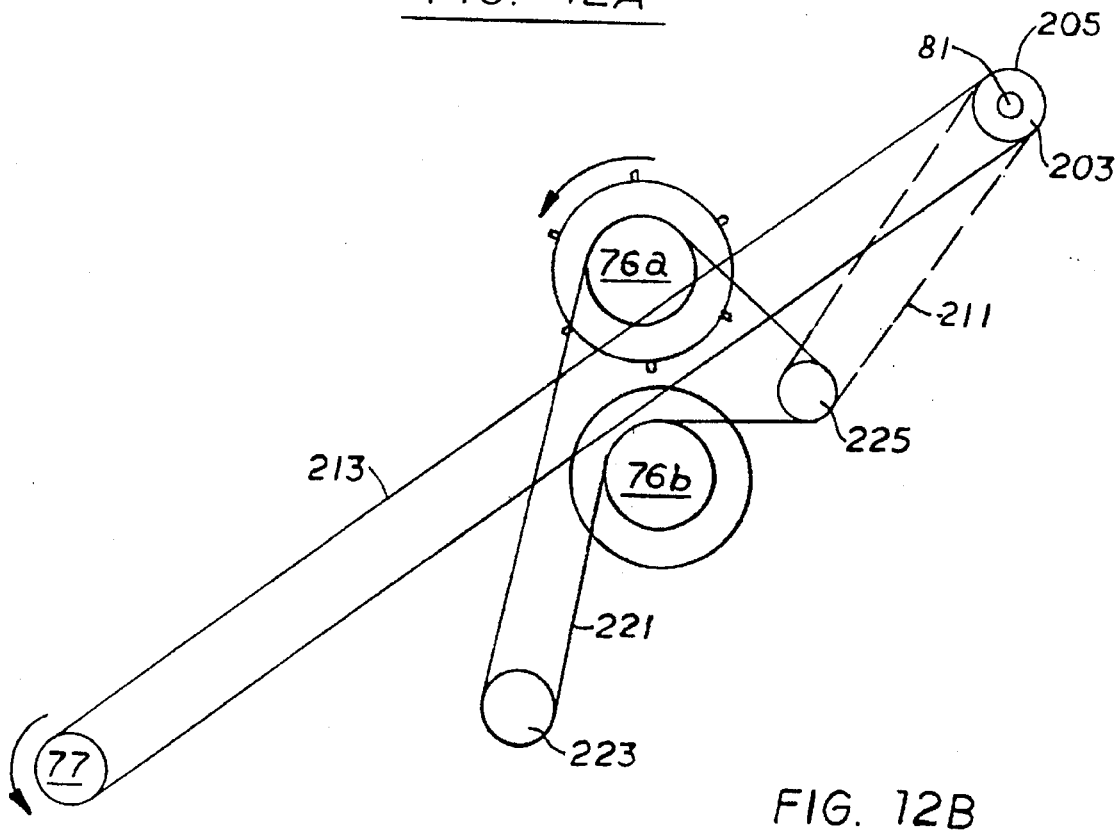
FIG. 12B is similar to FIG. 12A and shows a drive diagram for pulley 76a and a drive shaft 77.

Referring to FIGS. 12, 12A and 12B, power coming into sheave 83 directly drives the cutter blades 80 via base 82 mounted on shaft 81 which passes through chopper 4. Shaft 81 (FIG. 12) terminates in an electric clutch 201 which is controlled in the driver's cab D. The clutch 201 controls two sprockets, 203 and 205. A third sprocket 207 is not controlled by the clutch but always rotates with the sheave. As shown in FIG. 12A, the sprocket 207 drives the beater bar 84 of the cutter 4 via chain 209 so that the blades 80 can always coact with the bar 84 when the blades 80 rotate. Shaft 81 (FIG. 12B) powers the one upper roller 76a (nearest cutter 4) via chain 211 "fixed" to sheave 205. In actuality, the chain 211 inputs to a gear box 215 which outputs to an output drive 225 shown in FIGS. 12A, B. Details of the gearbox have been omitted so as to not obscure the invention, but the gear box 215 includes a linkage 217 that extends to the driver's cab D to disengage the gear box 215.

When the electric clutch 201 and gear box 215 are engaged, power from the sheave 83 transfers to the drive shaft 77 via chain 213 (FIG. 12B) and to the pressure rollers 76 via transmission 215. Chain 211 (FIG. 12B) "drives" through the gear box 215 by chain 221, which passes over drive sprocket 225, which controls the rotation rate. Drive sprocket 225 turns the chain 221 to rotate rollers 76a and 76b as well as idler 223. The rollers 76a and 76b driven by chain 221, in turn rotate a second pair of upper and lower rollers 76ab located closer to auger/paddle 3. Upper rollers 76a are synchronized by a common drive chain 227 (FIG. 12A). Lower pressure rollers 76b are synchronized by chain 229. Chain 221 synchronizes the upper and lower rollers 76. The upper roller nearest auger/paddle 3 has an aggressive toothed profile 231. The other upper roller also has teeth 233 which are not as aggressive (i.e. large). The lower rollers 76b are smooth. The rollers provide a moving floor and ceiling for the alfalfa.

The spray 1, pick up apparatus 2, auger and paddle assembly 3 and chopper 4 are all a self-contained unit operating within the housing and shroud assembly, portions of which were described in detail hereinabove. The forwardmost portion of this collection and chopping unit are supported by the sled runners 40 on the front and by a hitch mechanism just rearwardly of and laterally offset from the chopper station 4. FIG. 8 shows one detail by which the pick up apparatus, spray, auger and chopper area can be removed from the prime mover and cuber 10.

Figure 3:
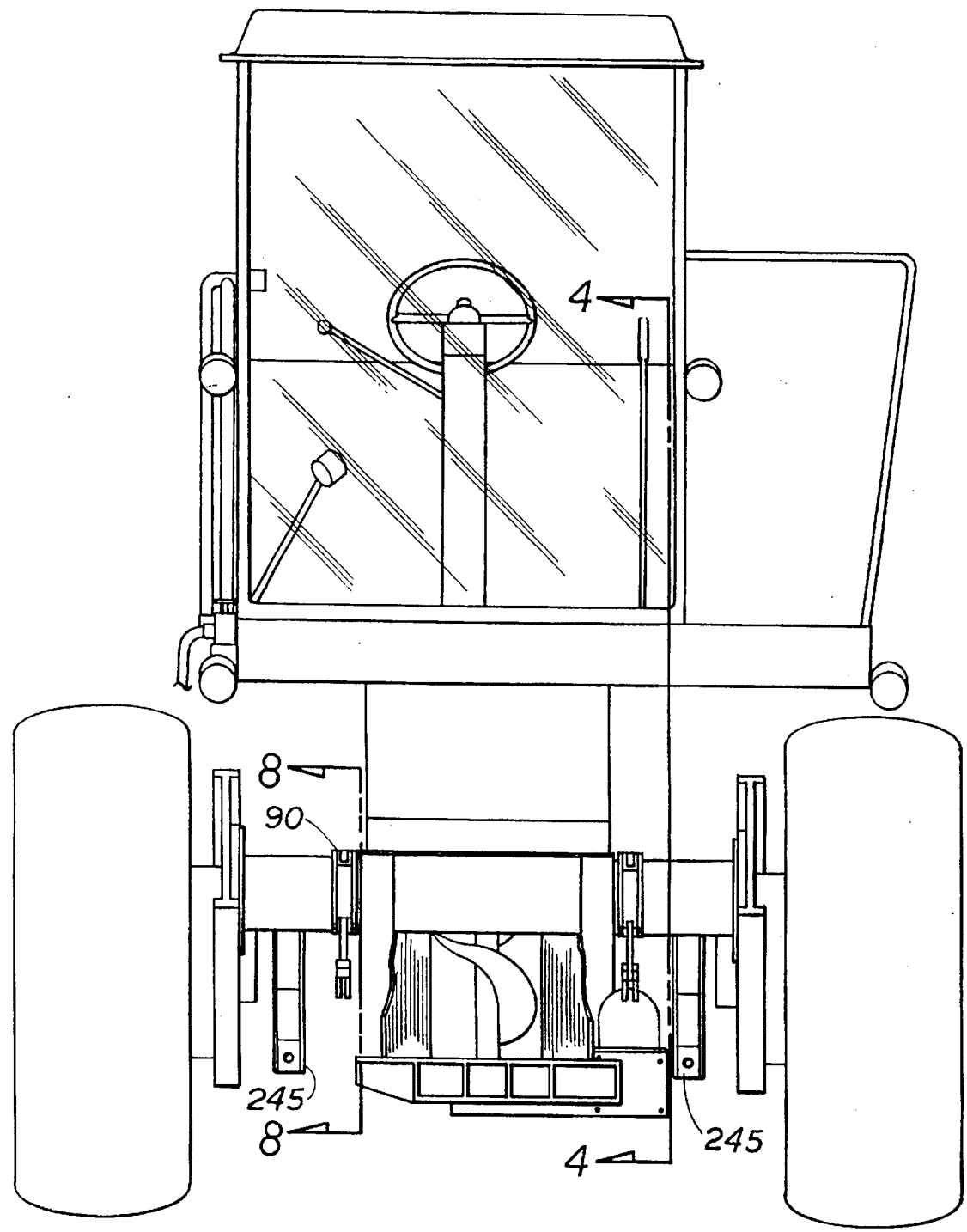
FIG. 3 is another front view, similar to FIG. 2 but with the forward portion of the vehicle comprising the spray station, pick up apparatus, auger and paddle stations, and chopper conveyor removed to expose an inclined auger.

FIG. 8 shows one coupler of the half pair of couplers shown in FIGS. 3 and 12 which removably attach the chopper, auger and paddle, spray and pick up assembly. In essence, a split collar 90 has a first stationary portion 92 and an arcuate pivotal portion 94 which swings from a closed position to the open position shown in FIG. 8 along the arrow H. Collar 90 engages a bar 96 supported on a tang 98 emanating from a rear shroud wall 89 adjacent the cutter 80 defining a portion of the chopper 4. More specifically, the split collar includes a clasp 93 which latches the arcuate moveable collar portion 94 about the bar 96. The split collar 90 is attached to a frame member 102. FIG. 12 reflects two shock absorption members 240 which dissipate force encountered by the skids 40. Force along the arrow Z is taken up by the springs 242 because a force transmitting collar 244 depresses the spring against a stationary sleeve 243. The rods 246 of the members 240 which attach to hydraulically actuated arms 245 (FIG. 3) can also move in a direction opposite Z via the hydraulically actuated arms 245. This can raise the unit forward of the coupler 90 off the ground i.e. in the direction of arrow Y, FIG. 1. The threaded ends of rods 246 have complementary threaded nuts 247 which allow for adjustment of the combined spray station 1, pick-up area 2, auger/paddle system 3 and cutting station 4 relative to the ground G and also provide the surface upon which arms 245 act to life the unit from the ground G.

FIG. 8 also shows that the frame 102 supports the hydraulic drives 104 to rotate the tires, such as fire T1. It is to be noted that the tires, T1 and T2 are driven by their own separate hydraulic motor for a multiplicity of reasons. The primary reason is that it removes from the undercarriage of the actor a clearance and space-consuming transmission which had afflicted prior art prime movers. An inclined auger 5 (FIG. 11 and FIG. 4) thus has adequate clearance under the driver's cab D to transport the cut alfalfa up the inclined auger to a cube forming station.

Figure 6:
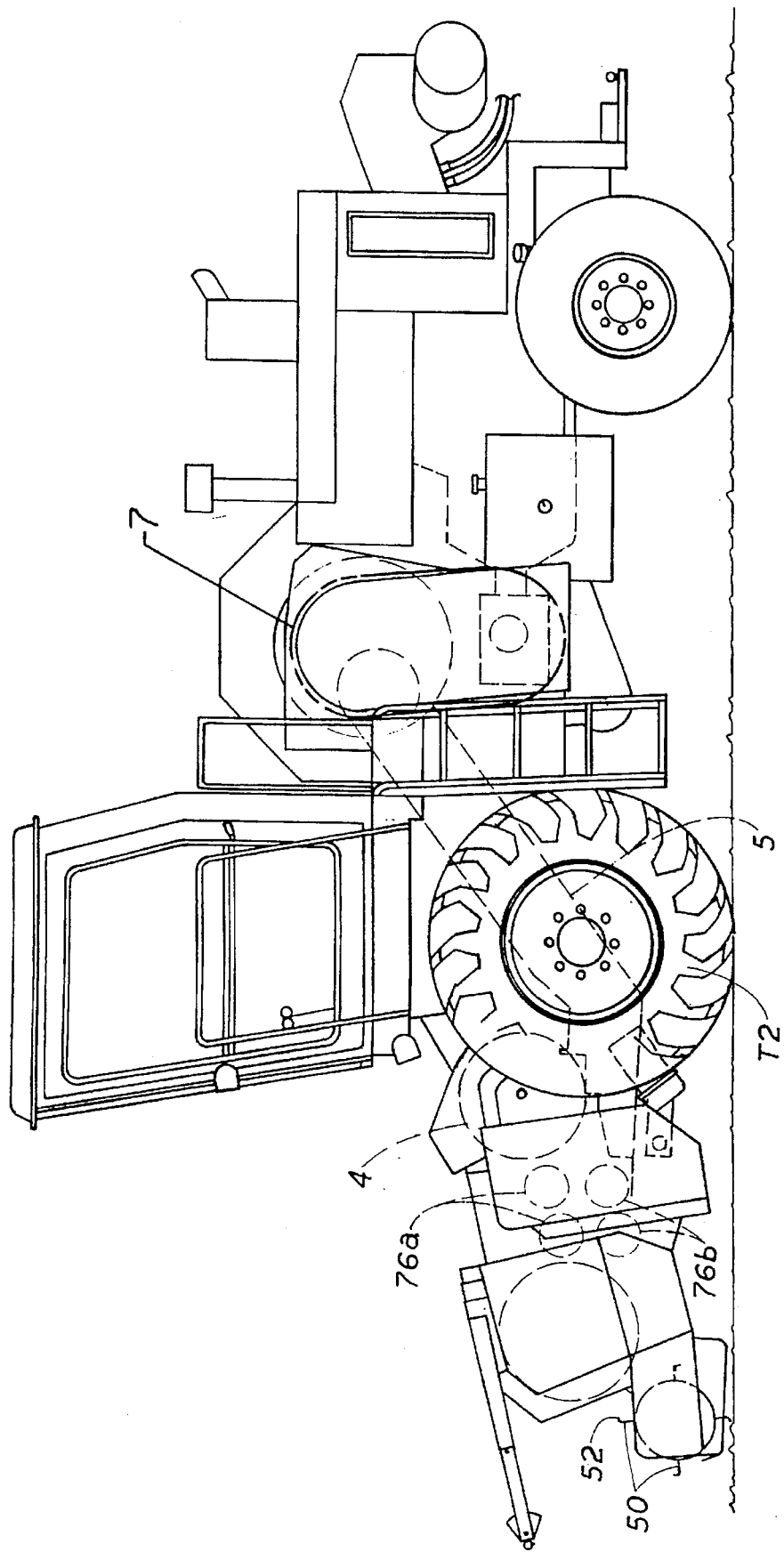
FIG. 6 is a view similar to FIG. 5 on an opposite side thereof.

As shown in FIG. 4, an inclined auger 5 allows the chopped alfalfa which has exited the chopper 4 along the arrow R to extend into the maw 100 of the inclined auger 5. If the inclined auger 5 is turned off, no power is delivered to the sheave 83 which drives the chopper 4, pick up 2 and auger 3. The maw 100 communicates with an interior of a hollow housing 103 which receives the alfalfa. An interior of the housing 103 supports an auger 105 therewithin. The auger, at a lowermost extremity is operatively coupled to a motor 108 to cause rotation of the auger such that chopped alfalfa will enter into the maw and then advance along the direction of the arrow I to be forced into the press 6 in a manner to be described. An uppermost extremity of the inclined auger 5 includes a downwardly depending auger shaft support 110 to hold the auger in proper registration with respect to the housing 103. FIG. 6 shows the relationship of the auger to the rest of the components in the cuber 10.

FIG. 11 best reflects the manner in which chopped alfalfa advances from the inclined auger of FIG. 4 and is pressed into cubes. FIG. 7 reflects the drive system used to drive the press 6. As shown in FIG. 7, a belt 112 allows the press drum to rotate along the direction of the arrow J. The belt 112 is provided with power by a hydraulic motor 114 coupled to an appropriate source of fluidic pressure by hoses 113 as shown in FIG. 7. The belt 112 is provided with appropriate tension by means of an idler 116 which tensions the belt by means of spring biasing which forces an idler arm 118 to exert a force along the direction of the arrow K and about pivot point 120. A sheave 122 receives the belt 112 and rotates the drum in manner to be described and with reference to FIG. 11.

As alfalfa is forced into the drum area, rotation of a central drum 125 via belt 112 about the direction of the arrow L causes a roller arm 126 to circumscribe an inner periphery of the extruder 128. The roller arm 126 is attached to the drum by means of a pinion 130 so that as the drum 125 moves along the direction of the arrow J, the roller arm 126 travels therewith forcing the cut alfalfa through a series of bores 132 formed in the extruder around the outer periphery of the drum 125. More specifically, the extruder 128 includes through bores 132 which receive the alfalfa therethrough and cause the alfalfa to be extruded conforming to a shape of the interior bores. Since the invention intends to provide "cubes" or another type of rectangular solid, the bores 132 are substantially rectangular in cross-section. By having the roller arm 126 press the alfalfa through the bores 132 and extrude the alfalfa therethrough, the alfalfa is therefore cubed. The roller arm preferably rides in a trackway at one side of the vehicle.

Since the inclined auger 5 feeds into the press between wheels T1 and T2, the central drum 125 preferably has flights 125a inboard the roller arm 126 which force the alfalfa towards the roller arm. Wall 134 also includes stationary inboard flights 134a which coact with the flights of the drum 125 to move the alfalfa to the roller arm 126.

Figure 5:
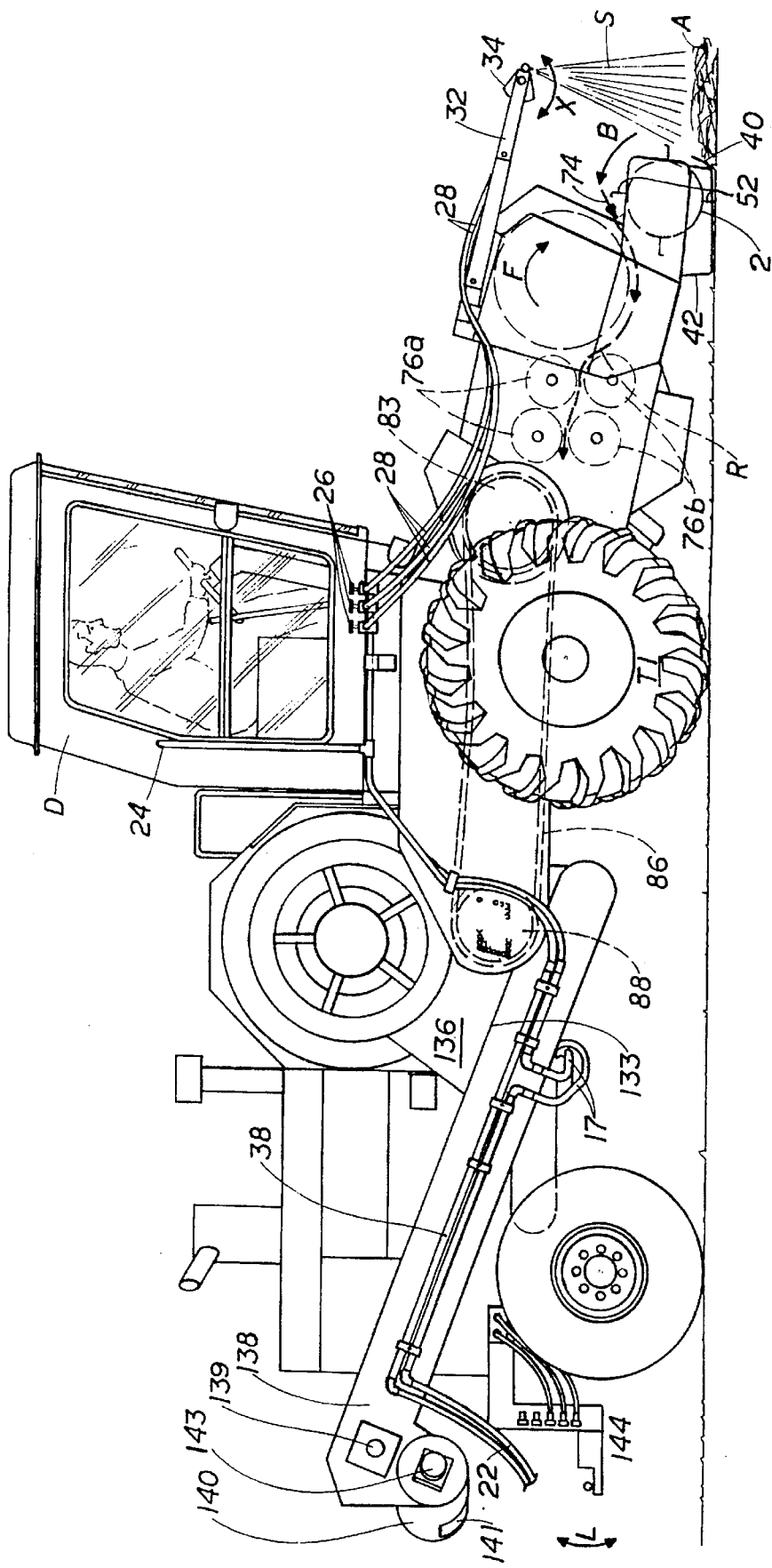
FIG. 5 is a more detailed view of FIG. 1 with a trailer portion removed so as to provide greater detail.

The addition of the water through the spray 1 at the beginning of the alfalfa gathering process mentioned hereinabove helps maintain a beneficial temperature profile and promote binding of the alfalfa during the extrusion process. Considerable force is involved in the extrusion process and concomitant heat is generated. The force that the roller arm exerts is so high that the heat generated by the pressure causes the water to raise in temperature to form steam. The steam is useful in causing the starch within alfalfa to form its own binding agent. This allows the cubes to form into cohesive blocks or cubes without the need of a binder. The bores 132 of the extruder 128 are circumscribed by a deflector wall 134 which forms an outer shroud. Upon contact by the shroud 134 with the cubes, extruded portions of the cubes break off at a certain length. The cubes fall by gravity down to the lowermost well of the shroud 134. As shown in FIG. 5, the shroud 134 communicates with a downwardly extending sloped trough 136 to encourage the cubes to exit to one side of the cuber 10 as shown in FIG. 5.

As also shown in FIG. 5, an opening 133 allows access between the well of the shroud 134 and an inclined shroud 134 and an inclined conveyor 138 which elevates the cubes from a lowermost elevation to an upper and rearwardmost portion of the prime mover just in front of the trailer assembly 8. The inclined conveyor 138 communicates with a transverse auger feeder 140 which redirects the tubes back towards a central portion of the vehicle, strategically located above a trailer hitch 144. As shown in FIG. 1, the transverse auger feeder 140 is directly above an open receiver 142 which is supported on a frame 160 of the trailer 8. The receiver 142 is directly aligned above a trailer hitch 144 so that even if there were rotation about the direction of the double-ended arrows L of FIG. 5, the receiver 142 (FIG. 9) is always in alignment with a discharge spout 141 of the transverse auger feeder 140.

Figure 9:
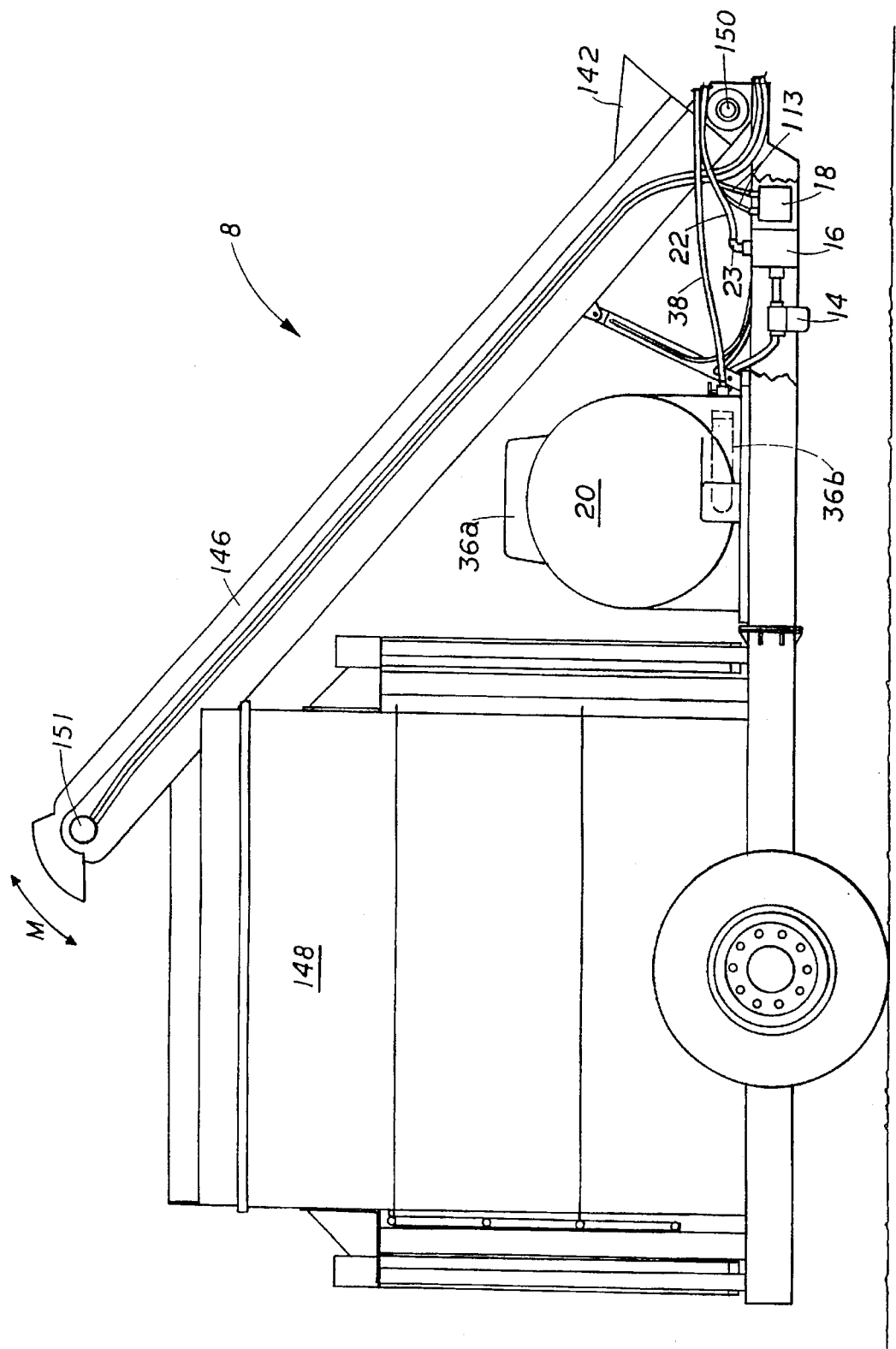
FIG. 9 is a side view of a trailer according to the present invention.
Figure 10:
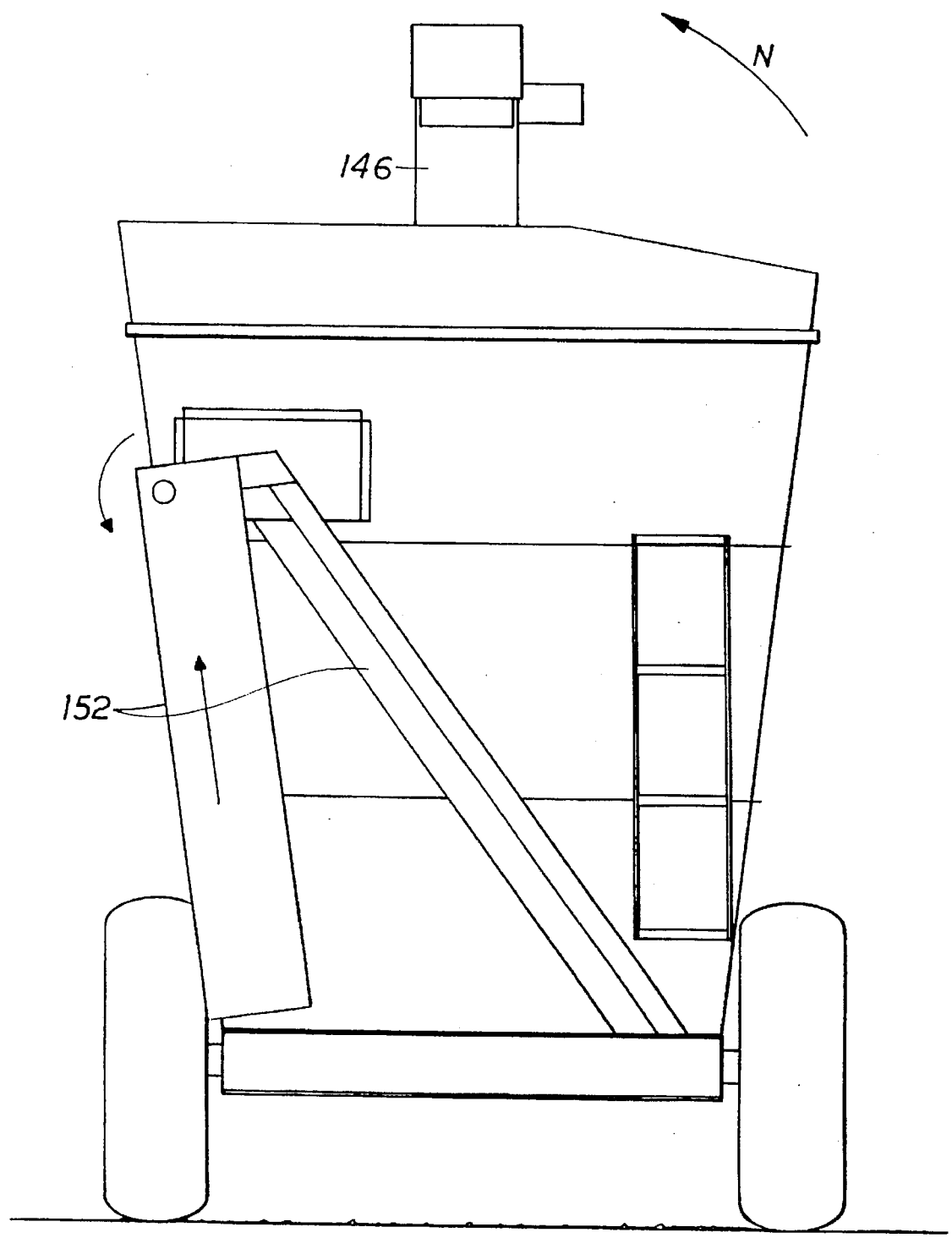
FIG. 10 is an end view of the trailer shown in FIG. 9.

In FIG. 9, the receiver 142 communicates with an elevator 146 driven by motor 151 that carries the cubes from the receiver 142 into an open-topped conventional bin 148. The elevator 146 is adapted to be adjusted about a pivot point indicated at 150 of FIG. 9 by extending link 149. By adjusting the elevation of the elevator along the arrow M, clearance can be had to remove the elevator away from alignment with the interior of the bin 148 so that the bin can be unloaded. As shown in FIG. 10, the bin is adapted to move in the direction of the arrow N for unloading by means of a linkage mechanism 152 known in the art.

Figure 13:
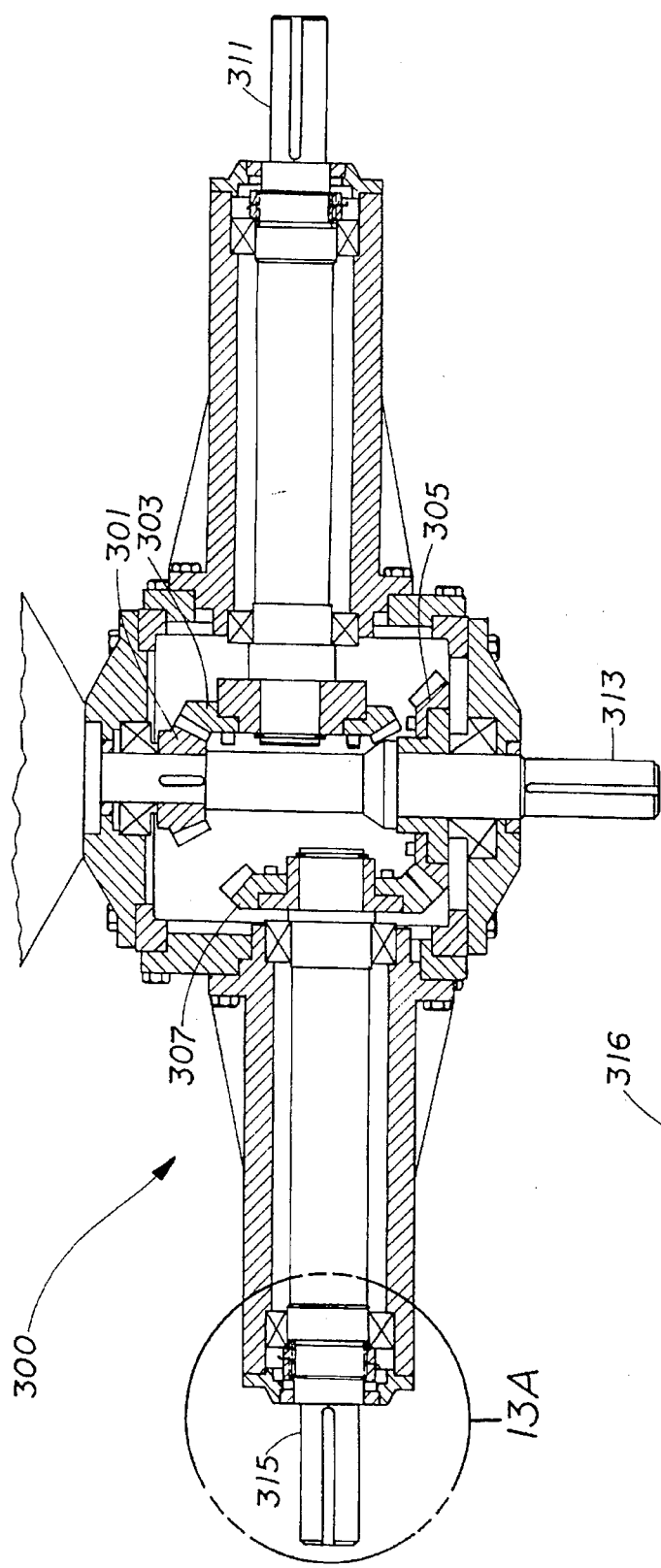
FIG. 13 details the gear box.
Figure 13A:
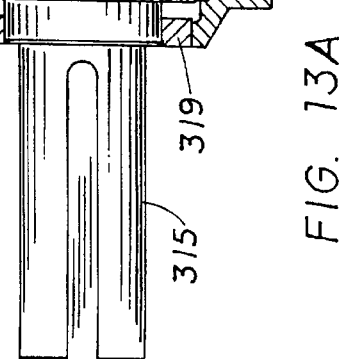
FIG. 13A details one shaft of the gear box.
Figure 14:
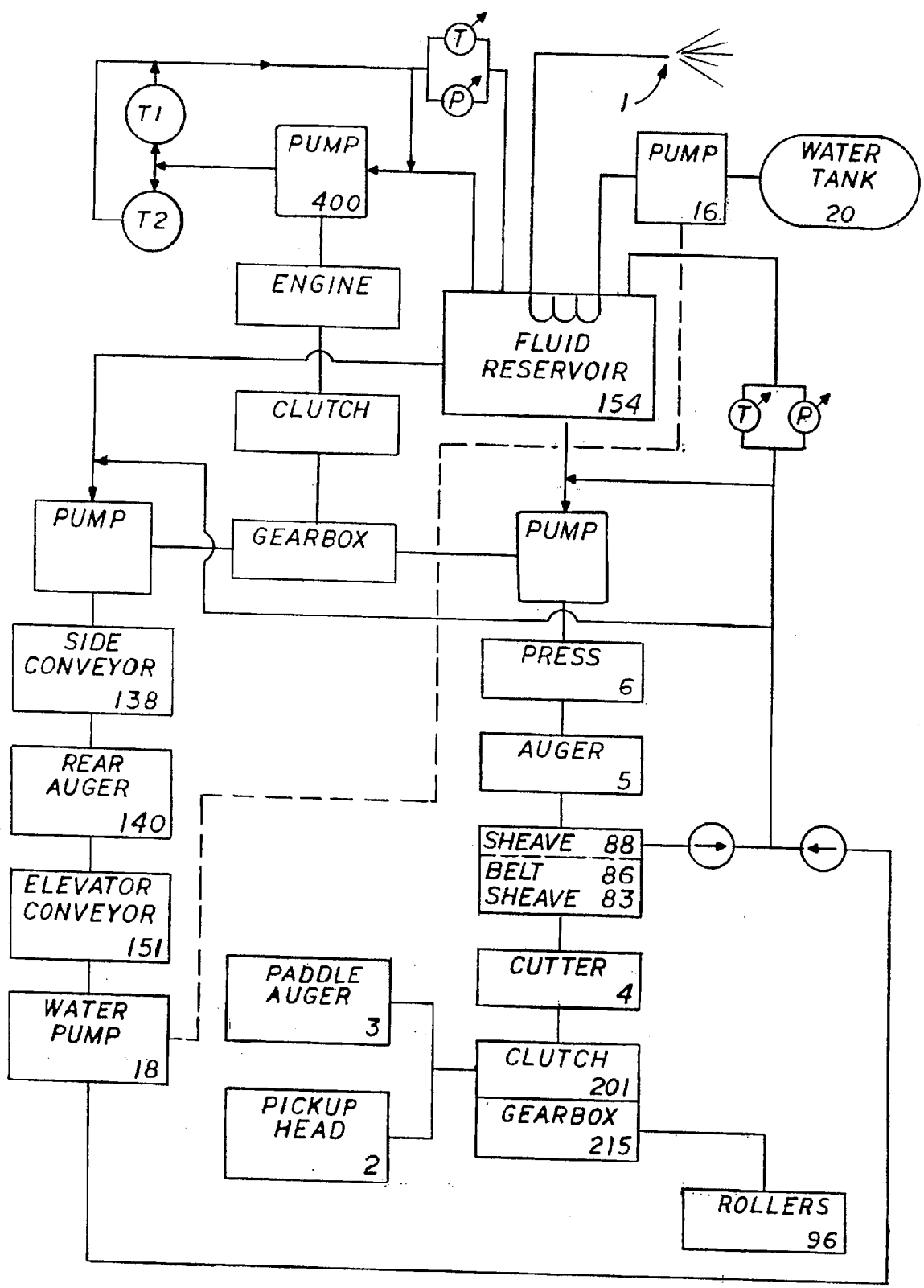
FIG. 14 details a fluid schematic for the system.

The fluid circuit (FIG. 14) can now be explained in conjunction with the gearbox (FIGS. 13, and 13A). An (internal combustion) engine provides power. This power is delivered to the FIG. 13 gearbox input 313 via a clutch and through a shaft coupler. The gearbox has a first output 311 which first pumps P hydraulic fluid from reservoir W to drive the press 6 (FIG. 7). Next, fluid exits a press motor and drives inclined auger 5 via auger motor. Next, pulley sheave 83 is driven via belts 86 and sheave 88. As noted infra, sheave 83 drives cutter 4. Thus all input to the press 6 is controlled by one fluid circuit to assure all systems together so that no jam-ups occur. As noted, clutch 201 and gearbox lever 217 can stop input to the cutter 4 and inclined auger 5 by stopping rollers 76, pick up 2 and paddle/auger 3. The inclined auger's fluid pressure can be monitored via a gauge G in the driver's cab to prevent jam-ups by clutch 201 or gear box 215.

The FIG. 13 gearbox has a second output 315 which drives all discharge conveyors that receive the cubes from the press 6. The side conveyor 138 receives fluid to its motor 139 and exhausts the fluid to the rear transverse auger 140 above the receiver via its motor 143. The fluid then travels to the trailer elevator 146 via its motor 151 and thence to the water pump motor 18 and then back to its reservoir. Because of this relationship, the operator knows all the elevators work because water—in his normal forward field of vision is seen being sprayed as the driver works. This means the press 6 won't bog down on the discharge side.

Note, the water includes a heat exchange loop 17 with the hydraulic reservoir 154. The tires T1 and T2 are each driven by hydraulic motors fed by the engine via pump 400. All circuits are protected against temperature and pressure spikes by check valves which allows fluid from the reservoir to be drawn on (see FIG. 14) if needed.

The gearbox 300 of FIG. 13 includes an input 313 configured as a clutch controlled power take-off from the engine which drives a bevel gear train 301, 303, 305, and 307. Outputs 311 and 315 are in the form of splined shafts allow coupling to other energy conversion devices, such as the pumps of FIG. 14. Each output shaft (e.g. 315) is protected from axial load and displacement via thrust bearings 316 held in place via retainers 318 and seal 319. Output 316 can couple to a direct mount hydraulic pump.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. An apparatus for processing cut field grass such as alfalfa into cubes, comprising, in combination:

a wheeled prime mover having an operator area and equipped with means for picking up the field grass from a field forward of the operator area, conveyor means supported by the prime mover for transporting the cut grass from said picking up means, cube forming means located behind the operator area and fed by said conveyor means and linked to said prime mover so that the grass can be fed from said conveyor means and compacted into cubes, said cube forming means including a shroud, an extruder having plural dies passing therethrough, said extruder located within said shroud, a drum rotateably supported in said extruder having means to rotate said drum, and a roller arm radially offset and mounted to said drum having an axis of rotation parallel to said drum and said roller arm contacting said extruder forcing grass therethrough, and delivery means coupled to said cube forming means for delivering formed grass cubes from said cube forming means.

2. The apparatus of claim 1 including a first hydraulic circuit driven by said prime mover, said first hydraulic circuit driving said picking up means said conveyer means and said cube forming means so that said firs hydraulic circuit assures power along a cube forming path.

3. The apparatus of claim 2 including a second hydraulic circuit driven by said prime mover and powering said delivery means.

4. The apparatus of claim 3 wherein moisture addition means is provided on said prime mover to be deployed on the cut field grass to adjust the moisture content thereof prior to formation into cubes.

5. The apparatus of claim 4 wherein said moisture addition means is powered by said second hydraulic circuit to provide a visual tell tale in the line of sight of an operator of the apparatus that said second hydraulic circuit is operational.

6. The apparatus of claim 5 including comminution means for chopping the cut field grass prior to forming the grass into a cube.

7. The apparatus of claim 6 wherein said wheeled prime mover includes hydraulic wheel activation means for each drive wheel of said prime mover thereby providing independent motion thereof and for providing clearance along an under carriage of said prime mover.

8. The apparatus of claim 7 wherein said conveyor means is interposed between said comminution means and said cube forming means and is oriented under said prime mover and between said prime mover drive wheels in a space normally occupied by a vehicle transmission.

9. The apparatus of claim 8 wherein saint delivery means receives cubes generated by said cube forming means and diverts said cubes first to a side of said prime mover and means for subsequent delivery to a rear and then to a central rear portion of the vehicle.

10. The apparatus of claim 9 wherein a trailer is hitched to said prime mover to receive said cubes and includes a ball and socket connection between said trailer and said prime mover, and said delivery means includes a discharge spout located on said prime mover vertically aligned with said ball and socket, a receiver on said trailer underlying said spout and also vertically aligned with said ball and socket whereupon articulation between the prime mover and the trailer keeps said receiver aligned with respect to said discharge spout for said cubes, and means to fill said trailer communicating with said receiver.

11. A method for forming cut field grass into cubed livestock forage, comprising the steps of:

picking up the cut grass with a prime mover, chopping the grass and forming the chopped grass into cubes concurrently with the prime mover picking up more grass, so that the cubes are formed while the prime mover is working in the field, and conveying the cubes away from a cube forming area of the prime mover, by diverting the cubes to one side of the prime mover and then to a rear of the prime mover.

12. The method of claim 11 including moistening the cut grass prior to picking it up with a prime mover.

13. The method of claim 12 including extruding the chopped moistened grass when pressing the chopped grass into cubes.

14. The method of claim 13 further including funneling the cut grass after picking it up to a central conveying station for chopping.

15. The method of claim 14 including directing the cut and chopped grass to pass underneath a central portion of the prime mover en route to the pressing step.

16. A method for forming cut field grass into cubed livestock forage, comprising the steps of:

picking up the cut grass with a prime mover, chopping the grass and forming the chopped grass into cubes concurrently with he prime mover picking up more grass, so that the cubes are formed while the prime mover is working in the field, and conveying the cubes away from a cube forming area of the prime mover, moistening the cut grass prior to picking it up with a prime mover, extruding the chopped moistened grass when pressing the chopped grass into cubes, funneling the cut grass after picking it up to a central conveying station for chopping, directing the cut and chopped grass to pass underneath a central portion of the prime mover en route to the pressing step, and taking the formed, pressed cubes and conveying the cubes away from the cube forming area by diverting the cubes to one side of the prime mover and then to a rear of the prime mover.

17. The method of claim 16 including recentering the cubes for discharge at centralmost rear portion of the prime mover into a receiving area of a trailer and conveying the cubes via an elevator to a storage bin on the trailer.

18. A cube formed by the method comprising:

picking up grass from a field using a prime mover, adjusting the moisture content of the cut grass, chopping the cut grass, rotating a drum about a central axis, pivoting a wheel to one side of the drum so that the wheel's axis of rotation is parallel to but radially spaced from the drum, such that the wheel is driven by drum rotation, subjecting the cut grass to heat and pressure by radially extruding the grass through a die of rectangular cross-section located on a periphery of the drum, forming a cube, and discharging the thus formed cube from a side of the prime mover.

19. The cube of claim 18 further including steaming the cut grass while forming the cube by virtue of the moisture converted to steam by the pressure added to the cut grass so that the starch within the grass forms a binder.

20. The cube of claim 19 including discharging the cube after having been extruded from the prime mover by conveying the extruded cube transverse to a long axis of the prime mover to a lateral aspect of the prime mover.

21. The cube of claim 18 including locating the wheel with an outer periphery to touch the die to press the grass through the die.

22. An apparatus for processing cut field grass such as alfalfa into cubes, comprising, in combination:

a wheeled prime mover having an operator area and equipped with means for picking up the field grass from a field forward of the operator area, conveyor means supported by the prime mover for transporting the cut grass from said picking up means, cube forming means located behind the operator area and fed by said conveyor means and linked to said prime mover so that the grass can be fed from said conveyor means and compacted into cubes, said cube forming means including a shroud, an extruder having plural dies passing therethrough, said extruder located within said shroud, a drum rotateably supported in said extruder having means to rotate said drum, and a roller arm radially offset and mounted to said drum having an axis of rotation parallel to said drum and said roller arm contacting said extruder forcing grass therethrough and delivery means coupled to said cube forming means for delivering formed grass cubes from said cube forming means, wherein said delivery means receives cubes generated by said cube forming means and diverts said cubes firs o a side of said prime mover and means for subsequent delivery to a rear and hen to a central rear portion of the vehicle.

23. A cube formed by the method comprising:

picking up grass from a field using a prime mover, adjusting the moisture content of the cut grass, chopping the cut grass, rotating a drum about a central axis, pivoting a wheel to one side of the drum so that the wheel's axis of rotation is parallel to but radially spaced from the drum, such that the wheel is driven by drum rotation, subjecting the cut grass to heat and pressure by radially extruding the grass through a die of rectangular cross-section located on a periphery of the drum, forming a cube, discharging the cube after having been extruded from the prime mover by conveying the extruded cube transverse to a long axis of he prime mover to a lateral aspect of the prime mover.

24. The cube of claim 23 including conveying the cube next to a rear then to a central point of the prime mover.

25. The cube of claim 24 including conveying the formed cube into a bin on a trailer for subsequent storage.

* * * * *